US009549250B2

(12) United States Patent
Herbig et al.

(10) Patent No.: US 9,549,250 B2
(45) Date of Patent: Jan. 17, 2017

(54) WIND NOISE DETECTION FOR IN-CAR COMMUNICATION SYSTEMS WITH MULTIPLE ACOUSTIC ZONES

(71) Applicant: NUANCE COMMUNICATIONS, INC., Burlington, MA (US)

(72) Inventors: Tobias Herbig, Ulm (DE); Markus Buck, Biberach (DE); Meik Pfeffinger, Ulm (DE)

(73) Assignee: NUANCE COMMUNICATIONS, INC., Burlington, MA (US)

( * ) Notice: Subject to any disclaimer, the term of this patent is extended or adjusted under 35 U.S.C. 154(b) by 0 days.

(21) Appl. No.: 14/406,629

(22) PCT Filed: Feb. 26, 2013

(86) PCT No.: PCT/US2013/027738

§ 371 (c)(1),
(2) Date: Dec. 9, 2014

(87) PCT Pub. No.: WO2013/187946

PCT Pub. Date: Dec. 19, 2013

(65) Prior Publication Data

US 2015/0156587 A1 Jun. 4, 2015

Related U.S. Application Data

(60) Provisional application No. 61/754,091, filed on Jan. 18, 2013, provisional application No. 61/657,863, filed on Jun. 10, 2012.

(51) Int. Cl.
*G01L 21/00* (2006.01)
*H04R 3/00* (2006.01)
*G10L 21/0208* (2013.01)

(52) U.S. Cl.
CPC .......... *H04R 3/002* (2013.01); *G10L 21/0208* (2013.01); *H04R 3/005* (2013.01); *H04R 2499/13* (2013.01)

(58) Field of Classification Search
CPC ...... H04R 3/002; G10L 21/02; G10L 21/0208; H03G 3/34

(Continued)

(56) References Cited

U.S. PATENT DOCUMENTS 5,033,082 A 7/1991 Eriksson et al.
5,034,984 A 7/1991 Bose (Continued)

FOREIGN PATENT DOCUMENTS

CN 1877517 A 12/2006
CN 101154382 A 4/2008

(Continued)

OTHER PUBLICATIONS

Chinese Patent Application No. 201380040082.6 Notification of the First Office Action dated Jan. 14, 2016, including translation, 19 pages.

(Continued)

*Primary Examiner* — Daniel Abebe
(74) *Attorney, Agent, or Firm* — Daly, Crowley Mofford & Durkee, LLP

(57) ABSTRACT

An in-car communication (ICC) system has multiple acoustic zones having varying acoustic environments. At least one input microphone within at least one acoustic zone develops a corresponding microphone signal from one or more system users. At least one loudspeaker within at least one acoustic zone provides acoustic audio to the system users. A wind noise module makes a determination of when wind noise is present in the microphone signal and modifies the microphone signal based on the determination.

18 Claims, 2 Drawing Sheets

(58) Field of Classification Search
USPC .......................................................... 704/226
See application file for complete search history.

(56) References Cited

U.S. PATENT DOCUMENTS

| | | | | |
|---|---|---|---|---|
| 6,363,156 | B1 | 3/2002 | Roddy | |
| 6,373,953 | B1 | 4/2002 | Flaks | |
| 6,496,581 | B1 | 12/2002 | Finn et al. | |
| 6,842,528 | B2 | 1/2005 | Kuerti et al. | |
| 7,117,145 | B1 | 10/2006 | Venkatesh et al. | |
| 7,171,003 | B1 | 1/2007 | Venkatesh et al. | |
| 8,121,307 | B2 | 2/2012 | Yamaguchi | |
| 8,873,774 | B2 * | 10/2014 | Rijken | H04H 60/04 381/119 |
| 9,008,322 | B2 * | 4/2015 | Botti | H03F 1/0211 330/51 |
| 2003/0063756 | A1 | 4/2003 | Geerlings et al. | |
| 2004/0076302 | A1 | 4/2004 | Christoph | |
| 2005/0265560 | A1 | 12/2005 | Haulick et al. | |
| 2006/0233391 | A1 | 10/2006 | Park et al. | |
| 2006/0262935 | A1 | 11/2006 | Goose et al. | |
| 2008/0144855 | A1 | 6/2008 | Wimer | |
| 2008/0226098 | A1 | 9/2008 | Haulick et al. | |
| 2008/0279366 | A1 * | 11/2008 | Lindbergh | H04M 1/2535 379/421 |
| 2008/0304679 | A1 | 12/2008 | Schmidt et al. | |
| 2009/0306937 | A1 | 12/2009 | Chen | |
| 2010/0035663 | A1 | 2/2010 | Haulick et al. | |
| 2010/0189275 | A1 | 7/2010 | Christoph | |
| 2010/0223054 | A1 * | 9/2010 | Nemer | H04R 3/007 704/219 |
| 2011/0004470 | A1 * | 1/2011 | Konchitsky | G10L 21/0208 704/226 |
| 2011/0026734 | A1 * | 2/2011 | Hetherington | G10L 21/0208 381/94.1 |
| 2012/0128163 | A1 | 5/2012 | Moerkebjerg et al. | |
| 2012/0140946 | A1 | 6/2012 | Yen et al. | |
| 2012/0148067 | A1 | 6/2012 | Petersen et al. | |
| 2012/0191447 | A1 * | 7/2012 | Joshi | G10L 21/0208 704/226 |
| 2012/0201396 | A1 | 8/2012 | Schmidt et al. | |
| 2013/0039514 | A1 | 2/2013 | Knowles et al. | |
| 2013/0294612 | A1 * | 11/2013 | Feng | H04R 3/005 381/66 |

FOREIGN PATENT DOCUMENTS

| | | |
|---|---|---|
| CN | 101350108 A | 1/2009 |
| CN | 102035562 A | 4/2011 |
| CN | 102239705 A | 11/2011 |
| CN | 102474694 A | 5/2012 |
| JP | 2010157964 | 7/2010 |
| WO | WO 02/32356 A1 | 4/2002 |

OTHER PUBLICATIONS

European Patent Application No. 13803472.3-1901 Extended European Search Report dated Feb. 19, 2016, 8 pages.

Nemer E. et al.,: "Single-microphone wind noise reduction by adaptive postfiltering", Applications of Signal Processing to Audio and Acoustics, 2009. WASPAA '09. IEEE workshop on, IEEE, Piscataway, NJ, USA, Oct. 18, 2009, pp. 177-180, 4 pages.

Notification Concerning Transmittal of International Preliminary Report on Patentability (Chapter 1 of the Patent Cooperation Treaty), PCT/US2013/027738, date of mailing Mar. 19, 2015, 7 pages.

Notification of Transmittal of the International Search Report and the Written Opinion of the International Searching Authority, or the Declaration, PCT/US2013/027738, date of mailing Apr. 26, 2013, 4 pages.

Written Opinion of the International Searching Authority, PCT/US2013/027738, date of mailing Apr. 26, 2013, 5 pages.

International Preliminary Report on Patentability, PCT/US2013/027738, date of issuance Mar. 10, 2015, 1 page.

U.S. Appl. No. 14/406,628, filed Dec. 9, 2014, Buck, et al.

Office Action dated Apr. 1, 2016 for U.S. Appl. No. 14/406,628; 14 pages.

U.S. Appl. No. 14/406,628 Notice of Allowance dated Aug. 15, 2016, 12 pages.

European Application No. 12878823.9 Extended Search Report dated Jul. 20, 2016 , 16 pages.

Sang-Mun Chi et al: "Lombard effect compensation and noise suppression for noisy Lombard speech recognition", Spoken Language, 1996. ICSLP 96. Proceedings., Fourth International Conference on Philadelphia, PA, USA Oct. 3-6, 1996, New York, NY, USA, IEEE, US, vol. 4, Oct. 3, 1996, pp. 2013-2016, XP010238177, DOI: 10.1109/ICSLP.1996.607193. ISBN: 978-0-7803-3555-4, 4 pages.

Jung et al: "On the Lombard Effect Induced by Vehicle Interior Driving Noises, Regarding Sound Pressure Level and Long-Term Average Speech Spectrum", Acustica United With Acta Acustica, S. Hirzel Verlag, Stuttgart, DE, vol. 98, Mar. 1, 2012, pp. 334-341, XP008178809, ISSN: 1610-1928, DOI: 10.3813/AAA.918517. 8 pages.

Schmidt G et al: "Signal processing for in-car communication systems", Signal Processing, Elsevier Science Publishers B.V. Amsterdam, NL, vol. 86, No. 6, Jun. 1, 2006, pp. 1307-1326, XP024997680, ISSN: 0165-1684, DOI: 10.1016/J.SIGPRO.2005.07.040. 20 pages.

Alfonso Ortega et al: "Cabin car communication system to improve communications inside a car", 2002 IEEE International Conference on Acoustics, Speech, and Signal Processing. Proceedings. (ICASSP). Orlando, FL, May 13-17, 2002; [IEEE International Conference on Acoustics, Speech, and Signal Processing (ICASSP)], New York, NY: IEEE, US, May 13, 2002, pp. IV-3836, XP032015678, DOI: 10.1109/ICASSP.2002, 5745493, ISBN: 978-0-7803-7402-7. 4 pages.

U.S. Appl. No. 14/406,628 Response to Office Action filed Jun. 30, 2016, 13 pages.

Chinese Patent Application No. 201380040082.6 Notice of Granting Patent Right for Invention dated Sep. 8, 2016,8 pages.

EP Application No. 13803472.3 Response to Official Communication filed on Sep. 7, 2016, 16 pages.

Response (with Reporting Letter) to Chinese Office Action dated Jan. 14, 2016 corresponding to Chinese Application No. 201380040082.6; Response filed on Jun. 7, 2016; 9 Pages.

Chinese Office Action (with English translation) dated Aug. 10, 2016; for Chinese Pat. App. No. 201280074944.2; 22 pages.

* cited by examiner

WIND NOISE DETECTION FOR IN-CAR COMMUNICATION SYSTEMS WITH MULTIPLE ACOUSTIC ZONES

CROSS REFERENCE TO RELATED APPLICATIONS

This application is a National Stage application of PCT/US2013/027738 filed on Feb. 26, 2013, and entitled "Wind Noise Detection For In-Car Communication Systems With Multiple Acoustic Zones," which claims priority from U.S. Provisional Patent Application No. 61/754,091, filed on Jan. 18, 2013, and U.S. Provisional Patent Application No. 61/657,863, filed on Jun. 10, 2012, which are incorporated herein by reference.

TECHNICAL FIELD

The invention relates to speech signal processing particularly in an automobile.

BACKGROUND ART

In-Car Communication (ICC) systems provide enhanced communication among passengers within a vehicle by compensating for acoustic loss between two dialog partners. There are several reasons for such an acoustic loss. For example, typically, the driver cannot turn around to listeners sitting on the rear seats of the vehicle, and therefore he speaks towards the wind shield. This may result in 10-15dB attenuation of his speech signal. To improve the intelligibility and sound quality in the communication path from front passengers to rear passengers, the speech signal is recorded by one or several microphones, processed by the ICC system and played back at the rear loudspeakers. Bi-directional ICC systems enhancing also the speech signals of rear passengers for front passengers may be realized by using two unidirectional ICC instances.

FIG. 1 shows an exemplary bi-directional ICC system for two acoustic zones which are represented by driver/front passenger and rear passengers where the system creates a dedicated ICC instance for each acoustic zone. The signal processing modules used by the ICC instance for each of the two acoustic zones of such a system typically include beamforming (BF), noise reduction (NR), signal mixing (e.g. for driver and front passenger), Automatic Gain Control (AGC), feedback suppression (notch), Noise Dependent Gain Control (NDGC) and equalization (EQ) as shown in FIG. 2. Beamforming steers the beam of a microphone array to dedicated speaker locations such as the driver's or co-driver's seat. Noise reduction is employed to avoid or at least to moderate background noise transmitted over the ICC system. Since speakers generally differ in their speaking habits, especially their speech volume, an AGC may be used to obtain an invariant audio impression for rear passengers irrespective of the actual speaker. Feedback suppression is generally needed to ensure stability of the closed-loop comprising loudspeaker, vehicle interior and microphone. The NDGC is used to optimize the sound quality for the listener, especially the volume of the playback signal. Additionally, the playback volume may be controlled by a limiter. Equalizing is required to adapt the system to a specific vehicle and to optimize the speech quality for the rear passengers.

SUMMARY OF EMBODIMENTS

Embodiments of the present invention are directed to an in-car communication (ICC) system that has multiple acoustic zones having varying acoustic environments. At least one input microphone within at least one acoustic zone develops a corresponding microphone signal from one or more system users. At least one loudspeaker within at least one acoustic zone provides acoustic audio to the system users. A wind noise module makes a determination of when wind noise is present in the microphone signal and modifies the microphone signal based on the determination.

The wind noise module may determine when wind noise is present using a threshold decision based on a microphone log-power ratio; for example, based on covariance of the microphone log-power ratio. In addition or alternatively, the wind noise module may determine when wind noise is present using a wind pulse detection algorithm for multiple microphones. The wind pulse detection algorithm may use a compensation factor applied to a time-frequency spectrum for the microphone signal; for example, the compensation factor may equalize one or more mid-frequency bands of the microphone signal. Or the wind noise module may determine when wind noise is present based on spectral features characteristic for wind noise. When wind noise is present, the wind noise module may mute, attenuate, perform wind noise suppression, and/or filter the microphone signal.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Figure 1:
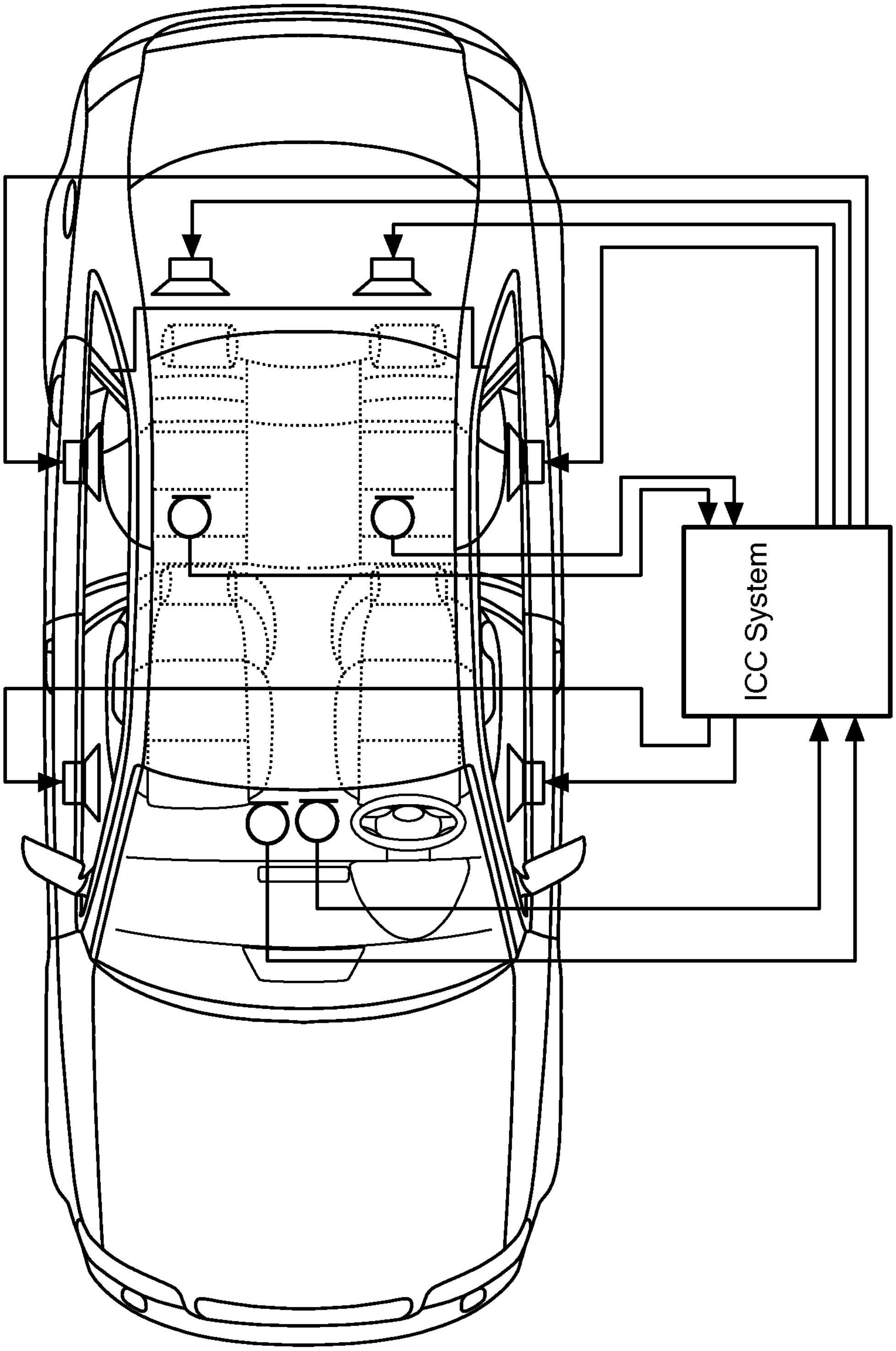
FIG. 1 shows an exemplary system for two acoustic zones which are represented by driver/front passenger and rear passengers.
Figure 3:
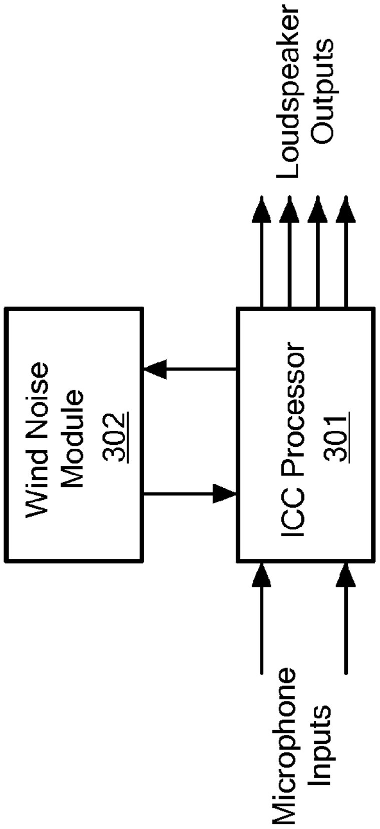
FIG. 3 shows an exemplary In-Car Communication (ICC) system with a wind noise module in accordance with an embodiment of the invention.

Embodiments of the present invention are directed to an ICC system for multiple acoustic zones, which detects when wind noise is present and adjusts its operation accordingly. FIG. 3 shows an exemplary vehicle speech communication system which includes an ICC processor 301 with a wind noise module 302 in accordance with an embodiment of the invention. The ICC system may be substantially similar to the one shown in FIG. 1 which provides services to a speech service compartment such as a passenger compartment in an automobile that holds one or more passengers who are system users. While the ICC system is explicitly described with respect to a car, it is to be understood that it may be associated with any speech service compartment and/or vehicle, such as, without limitation, a boat or a plane. The speech service compartment includes multiple acoustic zones having varying acoustic environments. At least one input microphone within at least one acoustic zone develops microphone signals from the system users. At least one loudspeaker within at least one acoustic zone provides acoustic audio to the system users. The ICC processor 301 may include hardware and/or software which may run on one or more computer processor devices.

Figure 2:
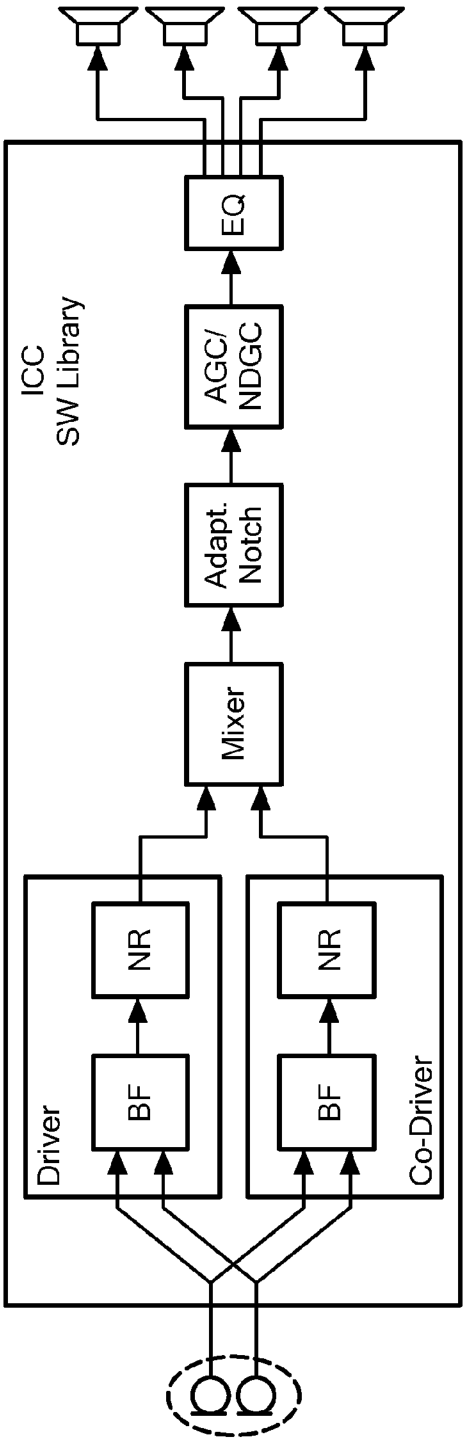
FIG. 2 shows an exemplary signal processing modules used in each of the two zones of the system of FIG. 1.

For each acoustic zone, the ICC processor 301 includes an ICC implementation with various signal processing modules that process the microphone input signals for the acoustic zone and produce processed audio outputs for the loudspeakers in the other acoustic zones. For example, the ICC implementations used by the ICC processor 301 for each acoustic zone may be basically as described above in connection with FIG. 2.

The ICC processor 301 selects one acoustic zone as active at any given time, using one or more microphone signals from the active acoustic zone and providing loudspeaker outputs signals to the other acoustic zones. The ICC processor 31 also disables the loudspeakers in the active acoustic zone. The wind noise module 302 accesses information from each acoustic zone to determine when wind noise is present in a given microphone signal. When that occurs, the wind noise module 302 modifies the processing of that microphone signal. For example, when wind noise is present, the wind noise module 302 may mute, attenuate, perform wind noise suppression, and/or filter the microphone signal. The wind noise module 302 may also stop the use of additional parameters, e.g. noise estimates and speech levels from the different acoustic zones that the ICC processor 301 is using.

Wind noises exhibit distinctive spectral characteristics that may be used to determine when wind noise is present in a microphone signal. For example, wind noise module 302 specifically exploits the fact that wind noises typically occur in low-frequency bands, e.g. 0 Hz-500 Hz, while the remaining audio frequency bands are less degraded or even not affected. In addition, the wind noise module 302 also uses the fact that speech from the users is not only recorded by the seat-dedicated microphone nearest a given user, but also by the remaining microphones of each acoustic zone. Therefore, the microphone signals will be correlated during speech activity. Wind noise, however, affects each microphone independently or has even only an effect on single microphones.

Thus, the wind noise module 302 may to process each microphone signal independently using an onset detection approach which compares the time trajectory of each microphone signal, especially in the low-frequency bands, and applies a wind noise threshold decision using the covariance of the log-power ratio of two or more microphone signals. For example, in the specific case of two microphones, the time-frequency spectra of the first and second microphone at time instance n and frequency bin k is denoted by $X_1(n,k)$ and $X_2(n,k)$. First, the log-powers of the first and second microphone are calculated in the low-frequency band:

$$P_1(n) = 10 \cdot \log_{10}\left(\frac{1}{K}\sum_{k=0}^{K-1} |X_1(n, k)|^2\right)$$

and $$P_2(n) = 10 \cdot \log_{10}\left(\frac{1}{K}\sum_{k=0}^{K-1} |X_2(n, k)|^2\right)$$

where K represents the number of frequency bins. Then the log-power ratio $\Delta(n)=P_1(n)-P_2(n))$ is used to estimate the corresponding variance $\text{Var}(n)=E\{(\Delta(n)-E\{\Delta(n)\})^2\}$. When the variance Var (n) exceeds a predetermined threshold, wind noise is detected.

In addition to the log-power ratio covariance, the wind noise module 302 also uses a second measure characterizing wind pulses. The wind noise module 302 applies a compensation factor to the time-frequency spectrum of each microphone signal. The wind noise module 302 calculates the compensation factor so that the power of one or more mid-frequency bands is equal for each microphone signal (the mid-frequency bands are less influenced by wind noises). The compensation factor is applied to all frequency bands. After power compensation, the wind noise module 302 compares the resulting low-frequency powers. When wind noise is present, the log-power ratio will be significantly increased.

Embodiments of the invention may be implemented in part in any conventional computer programming language such as VHDL, SystemC, Verilog, ASM, etc. Alternative embodiments of the invention may be implemented as pre-programmed hardware elements, other related components, or as a combination of hardware and software components.

Embodiments can be implemented in part as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention. For example, embodiments of the present invention specifically may be implemented in a unidirectional ICC system or a multi-directional ICC system.

What is claimed is:

1. An in-car communication (ICC) system for a plurality of acoustic zones having varying acoustic environments, the system comprising:

a first microphone within a first acoustic zone to generate a first microphone signal;

a second microphone within a second acoustic zone to generate a second microphone signal;

a first loudspeaker within the first acoustic zone and a second loudspeaker within the second acoustic zone to provide acoustic audio to system users;

a wind noise module configured to process the first and second microphone signals using a power covariance of the first and second microphone signals to generate a variance value and determine if the variance value exceeds a threshold, wherein the wind noise module is further configured to determine and apply a compensation factor to equalize power in a first group of frequency bands for the first and second microphone signals and determine for the first and second microphone signals a second group of frequency bands of lower frequency than the first group of frequency bands and compare the second group of frequency bands for the first and second microphone signals, wherein the presence of wind noise increases a power ratio of the first and second microphone signals for the second group of frequency bands.

2. The ICC system according to claim 1, wherein compensation factor is applied to a time-frequency spectrum.

3. The ICC system according to claim 1, wherein the wind noise module determines when wind noise is present based on spectral features characteristic for wind noise.

4. The ICC system according to claim 1, wherein the wind noise module mutes the first or second microphone signal when wind noise is present.

5. The ICC system according to claim 1, wherein the wind noise module is further configured to attenuate the first and/or second microphone signals when wind noise is present.

6. A computer-implemented method comprising:

receiving a first microphone signal from a first microphone within a first acoustic zone;

receiving a second microphone signal from a second microphone within a second acoustic zone;

generating at least one loudspeaker signal within the first and/or second acoustic zones to provide acoustic audio to system users;

processing the first and second microphone signals using a power covariance of the first and second microphone signals to generate a variance value and determine if the variance value exceeds a threshold;

determining and applying a compensation factor to equalize power in a first group of frequency bands for the first and second microphone signals; and determining for the first and second microphone signals a second group of frequency bands of lower frequency than the first group of frequency bands and compare the second group of frequency bands for the first and second microphone signals, wherein the presence of wind noise increases a power ratio of the first and second microphone signals for the second group of frequency bands.

7. The method according to claim 6, wherein the compensation factor is applied to a time-frequency spectrum.

8. The method according to claim 7, wherein the compensation factor equalizes one or more mid-frequency bands of the first and/or second microphone signal.

9. The method according to claim 6, wherein spectral features characteristic for wind noise are used for determining when wind noise is present.

10. The method according to claim 6, wherein the first and/or second microphone signal is muted when wind noise is present.

11. The method according to claim 6, wherein the first and/or second microphone signal is attenuated when wind noise is present.

12. The method according to claim 6, wherein the first and/or second microphone signal is modified to receive wind noise suppression when wind noise is present.

13. The method according to claim 6, wherein the first and/or second microphone signal is filtered when wind noise is present.

14. The method according to claim 6, further including selecting the first or second acoustic zone as an active acoustic zone and generating the at least one loudspeaker signal for the selected one of the first or second acoustic zone.

15. The method according to claim 14, further including disabling the at least one loudspeaker in the active acoustic zone.

16. The method according to claim 6, further including processing the first and second microphones independently using onset detection.

17. The method according to claim 6, wherein the power covariance comprises a log-power ratio.

18. An article, comprising:

a non-transitory computer-readable medium having stored instructions that enable an in-car communication (ICC) for a plurality of acoustic zones having varying acoustic environments to:

receive a first microphone signal from a first microphone within a first acoustic zone;

receive a second microphone signal from a second microphone within a second acoustic zone;

generate a loudspeaker signal within the first and/or second acoustic zones to provide acoustic audio to system users;

process the first and second microphone signals using a power covariance of the first and second microphone signals to generate a variance value and determine if the variance value exceeds a threshold;

determine and apply a compensation factor to equalize power in a first group of frequency bands for the first and second microphone signals; and determine for the first and second microphone signals a second group of frequency bands of lower frequency than the first group of frequency bands and compare the second group of frequency bands for the first and second microphone signals, wherein the presence of wind noise increases a power ratio of the first and second microphone signals for the second group of frequency bands.

* * * * *